United States Patent [19]

Kubogochi et al.

[11] Patent Number: 4,952,106
[45] Date of Patent: Aug. 28, 1990

[54] FASTENER HAVING SEPARATE PORTIONS FOR ENGAGING TWO PANELS TO BE SECURED TOGETHER

[75] Inventors: Hisasi Kubogochi; Youji Sato, both of Hiroshima, Japan

[73] Assignee: Nifco, Inc., Yokohama, Japan

[21] Appl. No.: 408,359

[22] Filed: Sep. 18, 1989

[30] Foreign Application Priority Data

Sep. 29, 1988 [JP] Japan .................. 63-126359[U]

[51] Int. Cl.⁵ ............................................. F16B 13/06
[52] U.S. Cl. ........................................ 411/48; 411/60;
411/508
[58] Field of Search ................... 411/40, 41, 45–48,
411/60, 61, 508–510, 913

[56] References Cited

U.S. PATENT DOCUMENTS 3,241,428  3/1966  Fischer .................................... 411/60
4,579,492  4/1986  Kazino et al. ......................... 411/60
4,840,523  6/1989  Oshida .................................... 411/48

FOREIGN PATENT DOCUMENTS 61-166212  10/1986  Japan ..................................... 411/60
421620  4/1967  Switzerland ......................... 411/60

Primary Examiner—Neill R. Wilson
Attorney, Agent, or Firm—Schwartz & Weinrieb

[57] ABSTRACT

A fastener comprises a female member and a male member. The female member has a flange-like head having a pin insertion hole, a hollow cylindrical leg section extending from the head and having a plurality of legs defined by means of a plurality of slits extending from the free end toward the head, and elastic locking portions provided upon the outer periphery of the leg section. The male member has a pin-like portion passing through the pin insertion hole formed within the head of the female member, and a large diameter portion and first and second reduced diameter portions adapted to pass through the insertion hole and capable of engaging the free ends of the plurality of legs so as to achieve various different engagement modes.

8 Claims, 6 Drawing Sheets

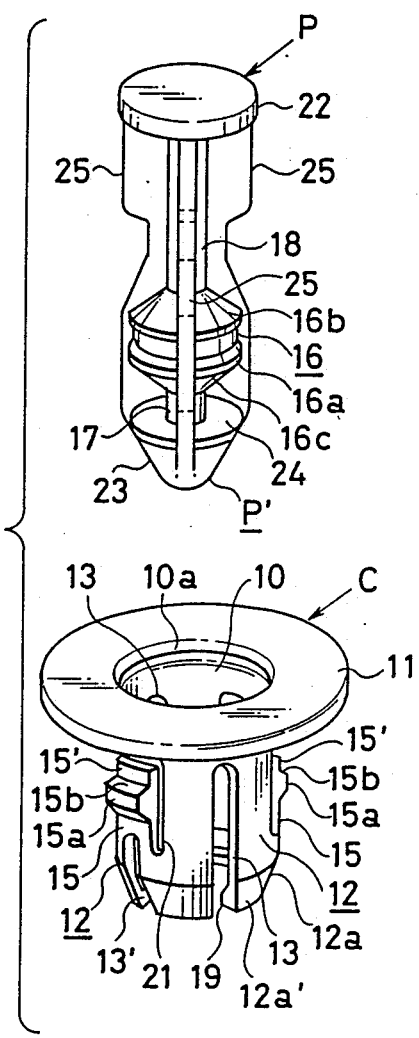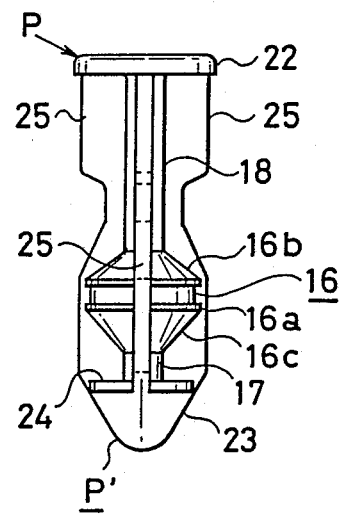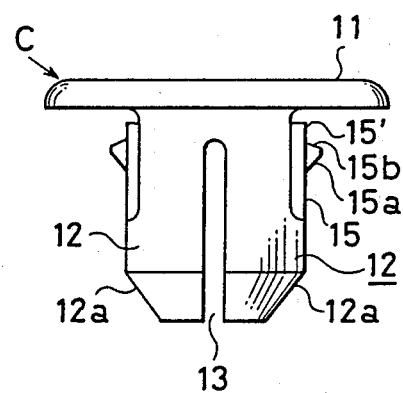
FIG.1
FIG.2
FIG.3

FASTENER HAVING SEPARATE PORTIONS FOR ENGAGING TWO PANELS TO BE SECURED TOGETHER

BACKGROUND OF THE INVENTION

This invention relates to a fastener for clamping two panels together or for securing a panel to a body member between a flange-like head and a leg section of a female member with the leg section thereof spread radially outwardly by inserting a male member into the female member. More particularly, the invention relates to a fastener in which the female member is temporarily mounted within a hole of a first panel-like member, a second panel-like member is fixedly secured after inserting the male member into the female member, and the second panel-like member can be released by inserting the male member into the female member still further.

DESCRIPTION OF THE PRIOR ART

Heretofore, riveting, spot welding, and the like, are used for coupling together panel-like members, for securing an ornamental member to a panel-like member or for securing an outer panel to a body member.

These methods permit firm securement of panel-like members to one another. On the negative side, however, the mounting or securing operation is rather cumbersome and requires some skill. In addition, scars and scratches or welding traces are liable to be produced upon the surface of an ornamental panel or the like.

Accordingly, it has been attempted to secure panel-like members together by using plastic fasteners. An ordinary plastic fastener consists of a flange-like head and a leg. The leg has elastically deformable locking portions extending toward the head. The fastener is inserted through aligned holes formed within overlapped panel-like members by causing inward flexing of the locking portions. When the flexed locking portions clear the holes, they are released so as to be restored to their initial state, whereby the overlapped panel-like members are clamped between the head and ends of the restored locking portions. Such a fastener can secure panel-like members together in an overlapped fashion. Besides, it causes fewer scars or scratches upon the surface of a secured member. Furthermore, neither looseness nor rattling is produced among the overlapped members secured together.

With this fastener, however, it is difficult to remove a panel or the like once it has been secured, if replacement or repair becomes necessary. Therefore, it is unsuitable as a means for securing a panel or the like which may require removal after it has been secured.

To solve the above problems, there has been proposed a fastener as disclosed in Japanese Utility Model Public Disclosure No. SHO 63-25813. This fastener comprises a female member having a leg section comprising a plurality of legs capable of being radially expanded away from one another and a male member to be inserted with force into a bore of the female member. By means of a first inserting operation, the leg section of the female member is radially expanded. By means of a second inserting operation, the leg section is released from its expanded condition and permitted to radially contract.

FIGS. 11 to 14 show this prior art fastener. As is shown, the fastener comprises a female member or clip C and a male member or pin P. It is used to couple together first and second panel-like members W and W'.

The clip C has a flange-like head 1, a plurality of legs 3 depending from the lower surface of the head 1 so as to be able to be radially expanded away from one another wherein each leg has an inward projection 2 provided at the free end thereof, and a central bore 4 penetrating the clip C from the top of the head 1 to the bottom of the legs 3. The pin P has a pin-like portion 5 having a length large enough to penetrate the bore 4, the pin-like portion 5 having an increased diameter portion 6 provided at an axially intermediate position and having a diameter not greater than the diameter of the bore 4, first and second reduced diameter portions 7 and 8 formed respectively below and above the increased diameter portion 6, and elastic locking portions 9 extending rearwardly from the leading free end of the pin P such that they flare toward the opposite free end of the pin P.

As shown in FIG. 12, the pin P is inserted into the clip C until the elastic locking portions 9 of the pin P project radially outwardly from the clip C, and in this state the clip C is inserted through the first panel-like member W. During this insertion process, the elastic locking portions 9 of the pin pass through the mounting hole w of the panel-like member W in a radially collapsed or contracted state. As soon as they clear the mounting hole w, they engage the edge of the hole w, thus producing a state of temporary securement.

Then as shown in FIG. 13, with the second plate-like member W' overlapped by means of the first plate-like member W, the pin P is inserted further and the projections 2 of the legs 3 engage the increased diameter portion 6 of the pin P. In this state, the legs 3 are spread radially outwardly and engage with the edge of the mounting hole w' of the second panel-like member W'. As a result, the first and second panel-like members W and W' are clamped between the head 1 and legs 3 of the clip C.

When the pin P is pushed further into the clip C as shown in FIG. 14, the projections 2 of the legs 3 are brought into engagement with the second reduced diameter portion 8 of the pin P. Thus, the legs 3 that have been engaging the second panel-like member W' are released from their radially spread state, thus releasing the coupling of the first and second panel-like members W and W'.

This prior art fastener, however, can be temporarily secured to the first panel-like member W only when its clip C and pin P are assembled together. That is, the clip C by itself cannot be temporarily mounted upon the first panel-like member.

Therefore, it is probable that the pin P of the fastener temporarily secured to the first panel-like member W will be erroneously inadvertently pushed into the clip C, thus disabling the mounting of the second panel-like member W'. Furthermore, when temporarily securing the clip C, it is necessary to push a portion of the flange-like head 1 of the clip C without pushing the head of the pin P. This operation, that is, the temporary securement of the fastener, is considerably difficult. Furthermore, since the clip C temporarily secured to the first panel-like member W entirely closes the mounting hole w of the first panel-like member W, it is impossible to visually confirm the insertion of the clip C through the second panel-like member W'. The operation, therefore, has to rely upon perception, so that it is difficult to improve operational efficiency.

Still further, the pin P is provided with the elastic locking portions 9 for temporarily securing the fastener to the first panel-like member W. Since the elastic locking portions 9 are adapted to project outwardly from the free ends of the legs 3 of the clip C, they are inevitably narrow and long. Consequently, the temporary securement of the clip C to the first panel-like member W is unreliable, and detachment or deformation of the temporarily secured clip C is probable. Furthermore, since the pin P is provided with the elastic locking portions 9 for temporary securement, when the engagement of the second panel-like member W' by means of the legs 3 is released by further insertion of the pin P into the clip C, the elastic locking portions 9 are liable to engage the second panel-like member W' when the latter is to be removed from the first panel W. In this case, the second panel-like member W' cannot be smoothly removed relative to the clip C.

OBJECTS OF THE INVENTION

It is intended that this invention will solve the above described problems of the prior art and its object is to provide a fastener which permits temporary securement of a female member to a first panel-like member, eliminates erroneous insertion of a male member when a second panel-like member is secured to the first panel-like member, and permits visual confirmation of locking of the fastener within the second panel-like member through means of a hole of the female member.

Another object of the invention is to provide a fastener which permits reliable temporary locking of the fastener to the first panel-like member and smooth removal of the second panel-like member from the fastener.

SUMMARY OF THE INVENTION

In order to attain the above objects of the invention, there is provided a fastener which comprises a female member having a flange-like head having a pin insertion hole and a hollow cylindrical leg section projecting from an edge portion of the head surrounding the pin insertion hole and defining an inner space communicating with the pin insertion hole, and a male member having a pin-like portion to be inserted with force into the female member from the pin insertion hole, the leg section of the female member having a plurality of legs defined by means of a plurality of slits extending from the free end of the leg section toward the head, the inner space being for inserting the male member therethrough, the free ends of the plurality of legs defining a hole-like space having a dametrical dimension which is smaller than the diameter of the pin insertion hole, the leg section having elastic locking portions projecting radially outwardly from the outer periphery thereof and extending from the free end of the leg section toward the head, the pin-like portion of the male member including at least a large diameter portion passing through the hole of the female member and first and second diameter portions formed ahead of or before, and after the large diameter portion in the longitudinal direction of the male member.

With this fastener, by inserting the female member from the leg section thereof through the mounting hole of the first panel-like member, the first panel-like member is clamped along the edge of the mounting hole between the elastic locking portions of the leg section and the head of the female member, whereby the female member is temporarily secured to the first panel-like member.

In this state, the second panel-like member is overlapped over the first panel-like member such that the leg section 12 of the female member can be inserted through the mounting hole of the second panel-like member, and the male member is inserted into the hole of the female member so as to bring the large diameter portion of the male member within the hole-like space of the female member and in axial alignment with the free ends of the plurality of legs of the female member.

As a result, the legs of the female member are spread radially outwardly so as to clamp the first and second panel-like members in cooperation with the head of the female member.

When the male member is further inserted into the female member, is disposed within the hole-like space of the female member and in axial alignment the free ends of the legs. In consequence, the legs are released from their radially outwardly spread state, and the second panel-like member can be removed from the fastener.

After the first panel-like member is temporarily secured to the female member, the male member may be inserted so as to assemble the female and male members such that the first reduced diameter portion of the male member is located in the gap at the free ends of the legs of the female member. In this case, the first and second panel-like members can be assembled without fully inserting the male member through the female member.

As is shown, with the fastener according to the invention the female member by itself can be temporarily secured to the first panel-like member, thus avoiding erroneous insertion of the male member.

Furthermore, with the fastener constructed according to the invention the female member by itself can be held within the first and second panel-like members and can be reliably temporarily secured to the first panel-like member. Furthermore, the fastener permits smooth removal of the second panel-like member when desired.

BRIEF DESCRIPTION OF THE DRAWINGS

The above and other objects and features of the invention will become more apparent from the following detailed description with reference to the accompanying drawings, wherein like reference characters designate like or corresponding parts throughout the several views, and wherein:

FIG. 1 is a perspective view showing an embodiment of the fastener constructed according to the invention with the female member and the male member separated from each other;

FIG. 2 is a front view showing the male member shown in FIG. 1;

FIG. 3 is a front view showing the female member shown in FIG. 1;

DETAILED DESCRIPTION OF THE PREFERRED EMBODIMENT

A typical embodiment of the fastener constructed according to the invention will now be described with reference to the accompanying drawings. The fastener comprises a clip C (a female member) and a pin P (a male member) which are both made of a plastic material so that they can undergo elastic deformation peculiar to plastic material and they are fabricated by, for example, by means of extrusion molding.

Figure 4:
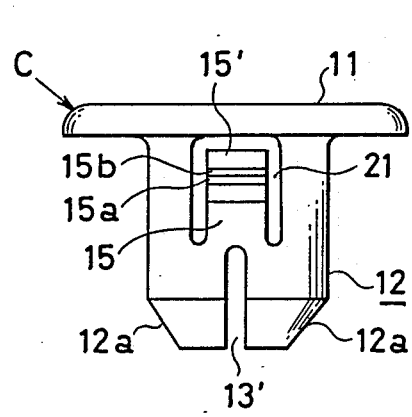
FIG. 4 is a side view showing the female member shown in FIG. 1.
Figure 5:
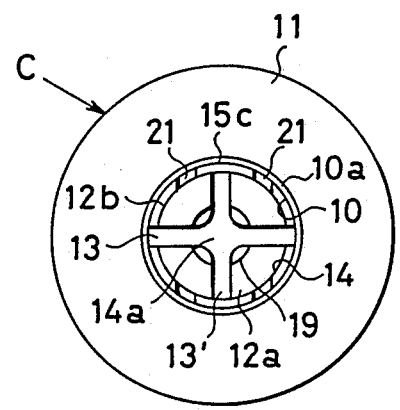
FIG. 5 is a bottom plan view of the female member shown in FIG. 4.
Figure 6:
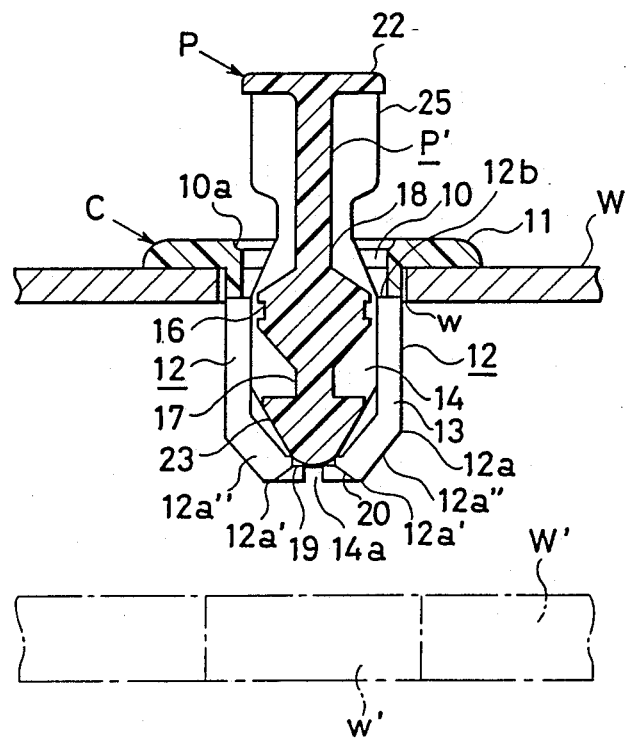
FIG. 6 is a sectional view showing the fastener shown in FIG. 1 temporarily secured to a first panel-like member.

The clip C has a flange-like head 11 having a substantially central hole 10 for inserting the pin P therethrough and a hollow cylindrical leg section 12 depending from the edge portion of the head 11 surrounding the hole 10 and having an inner space 14 communicating with the hole 10. In the head 11, an annular depression 10a is formed so as to surround the inlet end of the hole 10 and thereby facilitate smooth insertion of the pin P. The leg section 12 consists of legs 12a such that the inner space 14 defined thereby and communicating with the hole 10 is slightly smaller in diameter than the hole 10. That is, the legs 12a define inner top shoulders 12b, as seen in FIGS. 5 and 6, upon which a head 22 of the pin P can rest.

The legs 12a of the leg section 12 are defined by means of a corresponding number of slits 13 extending from the free end of the section 12 toward the flange-like head 11. The legs 12a define the space 14 into which the pin P is inserted. Each of the legs 12a has a radially inwardly and downwardly inclined portion 12a" terminating in the free end 12a'. The free ends 12a' of the legs 12a form a hole-like space 14a. The diameter of the hole-like space 14a, that is, the distance defined between the free ends 12a' of diametrically opposed legs 12a, is smaller than the diameter of the hole 10.

The inclined portions 12a" each have an engagement projection 19 projecting radially inwardly from the free end 12a' for providing a stable state of engagement with respect to a groove of the pin P to be described later. Each leg 12a also has an inclined surface 20 extending from the free end 12a' to the engagement projection 19 and inclined toward the stem of the leg 12a. When the inserted pin P is withdrawn, the inclined portions 12a" are adapted to again be disposed within a first reduced diameter portion 17 of the pin P.

The leg section 12 also has short slits 13' formed between adjacent slits 13 and extending from its free end toward the head 11. The short slits 13' thus further divide the leg section 12. An elastic locking portion 15 is provided between each of the short slits 13' and the head 11.

Figure 7:
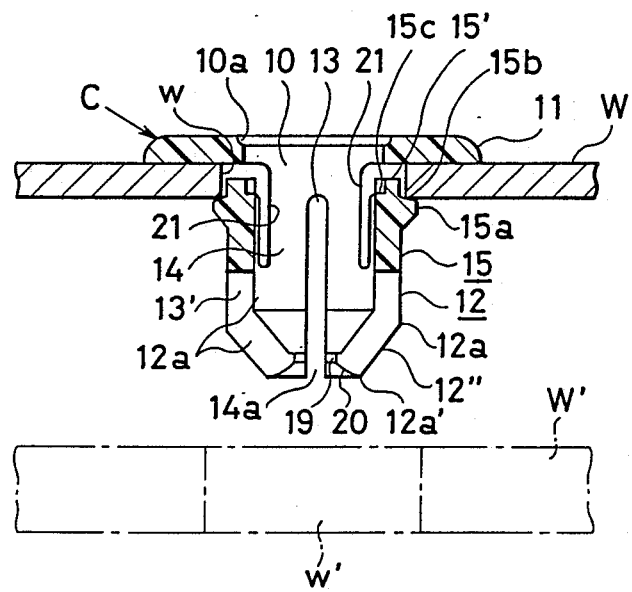
FIG. 7 is a sectional view showing the female member temporarily secured to the first panel-like member.
Figure 8:
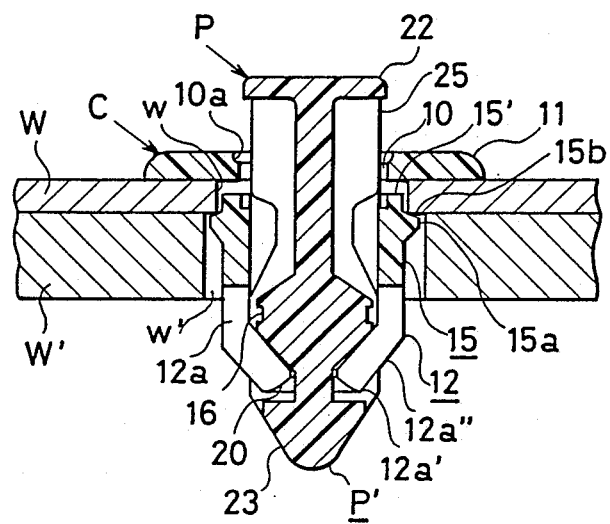
FIG. 8 is a sectional view showing a state in which a second panel-like member is mounted upon the fastener temporarily secured to the first panel-like member.

Each elastic locking portion 15 is defined by means of a U-shaped slit 21 with two leg portions thereof extending toward the free end of the leg section 12. Thus, each elastic locking portion 15 is elastically deformable at its stem. It has a radially outward projection 15a defined at a slight distance from its free end 15' which is disposed nearer the head 11. The projection 15a has a frustoconical sectional profile. The projection 15a has a shoulder 15b on the side of the free end 15' of the elastic locking portion 15. The clip C thus a structure such that the shoulder 15b and free end 15' of each elastic locking portion 15 engage the edge of the mounting hole w of the first panel-like member W as best seen in FIG. 7. Each leg 12a further has an inner shoulder 15c on its side opposite the elastic locking projection 15a. The inner shoulders 15c constitute, in conjunction with the inner top shoulders 12b of the legs 12a, a recessed section for accommodating the head 22 of the pin P.

Figure 9:
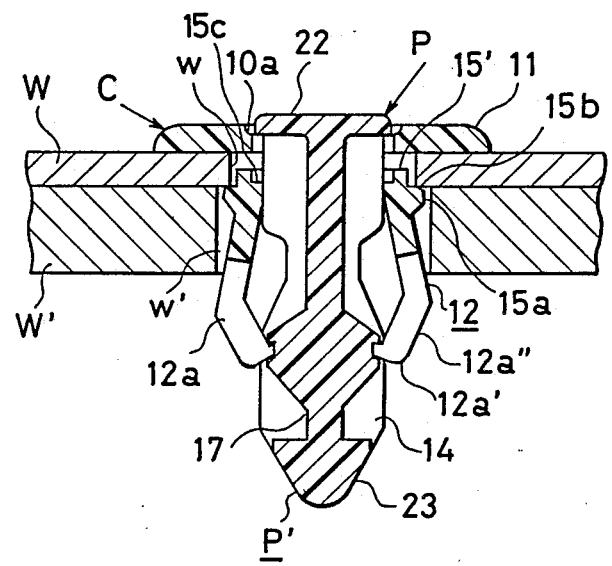
FIG. 9 is a sectional view showing the fastener constructed according to the invention coupling together first and second panel-like members.

The pin P has a pin-like portion P' to be inserted into the clip C through means of the hole 10 thereof and the head 22 has a greater diameter than the diameter of the pin-like portion P'. The pin-like portion P' has a large diameter portion 16 having a diameter not greater than the diameter of the hole 10 of the clip C and first and second reduced diameter portions 17 and 18 provided below and above the large diameter portion 16. The large diameter portion 16 has an annular groove 16a, in which the engagement projections 19 of the legs 12a of clip C may be engaged so as to maintain the legs 12a in their radially outwardly expanded mode as seen in FIG. 9, and also has tapered surfaces 16b and 16c terminating in the respective reduced diameter portions 18 and 17.

The free end of the pin-like portion P' opposite the head 22 has a tapering insertion head 23. The insertion head 23 has a shoulder 24 terminating in the first reduced diameter portion 17.

The pin-like portion P' has ribs 25 extending in its longitudinal direction and connecting the head 22 and the insertion head 23. The ribs 25 permit facilitate insertion of the pin P through the clip C without rattling.

With the fastener having the above construction according to the invention, the clip C is first secured to the first panel-like member W as shown in FIG. 7. As the leg section 12 of the clip C is inserted into the hole w of the first panel-like member W, the elastic locking portions 15 are flexed radially inwardly, and they are restored radially outwardly when the outward projections 15a clear the hole w. As a result, the edge of the hole w is engaged by means of the shoulder 15b and free end 15' of each elastic locking portion 15. The first panel-like member W thus is clamped between the head 11 and shoulders 15b of the clip C. At this time, the extent of radial spreading of the elastic locking portions 15 is restricted by means of the free ends 15' of the elastic locking portions 15, so that stable temporary locking between the fastener and the first panel-like member W can be obtained.

In this state, the clip C is inserted through the mounting hole w' of the second panel-like member W' disposed in an overlapped mode with respect to the first panel-like member W and is positioned therein. Then, the pin P is inserted. The pin P is inserted to a position at which the insertion head 23 of the pin P projects outwardly beyond the legs 12a of the clip C and the engagement projections 19 of the inclined portions 12a"

engage the first reduced diameter portion 17 of the pin P.

Since the insertion head 23 of the pin P is tapered toward the end, the inclined portions 12a" of the legs 12a can be readily spread radially outwardly. Thus, once the pin P is inserted, the free ends 12a' of the legs 12a engage the shoulder 24 of the pin P so that the pin P cannot be readily withdrawn from the clip C.

In this way, it is confirmed that the second panel-like member W' is correctly mounted, and then the pin P is inserted further into clip C as shown in FIG. 9, bringing the large diameter portion 16 of the pin P into the space 14a of the clip C as defined between the free ends 12a' of the legs 12a. With such insertion of the pin P, the engagement projections 19 of the inclined portions 12a" of the clip C slide along the tapered surface 16c of pin P and reach the large diameter portion 16 of the pin P so as to be received within the annular groove 16a of the portion 16, so that the legs 12a are held in a maintained in their radially outwardly spread state. As a result, the second panel-like member W' overlapped over with respect to the first panel-like member W is firmly clamped between the head 11 and legs 12a of the clip C.

Figure 10:
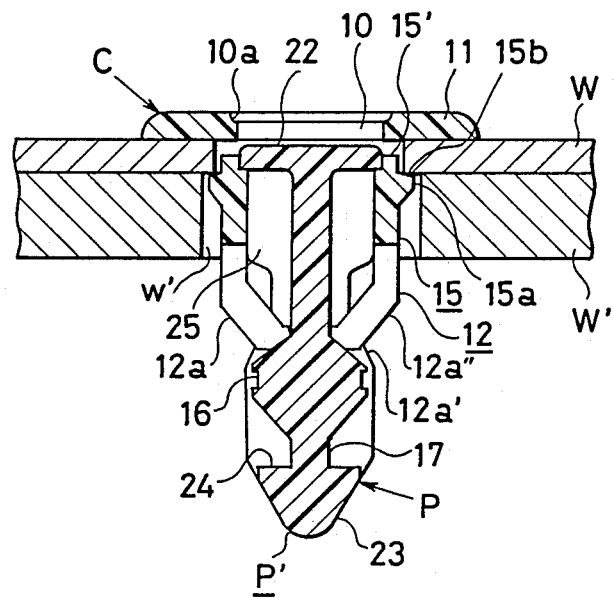
FIG. 10 is a sectional view showing a state in which the second panel-like member, to which the fastener constructed according to the invention was coupled, is released.
Figure 11:
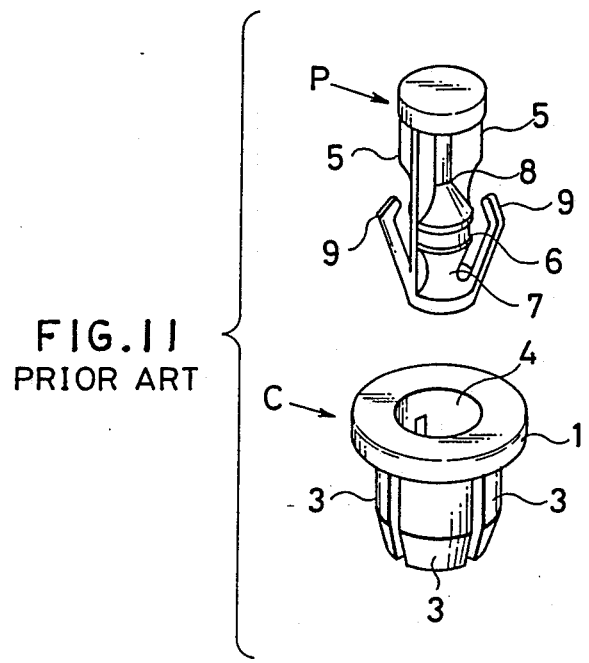
FIG. 11 is a perspective view showing a prior art fastener with a clip and a pin separated from each other.
Figure 12:
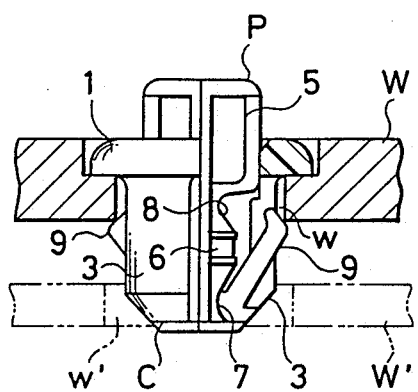
FIG. 12 is a side view, partly in section, showing the prior art fastener temporarily secured to the first panel-like member.
Figure 13:
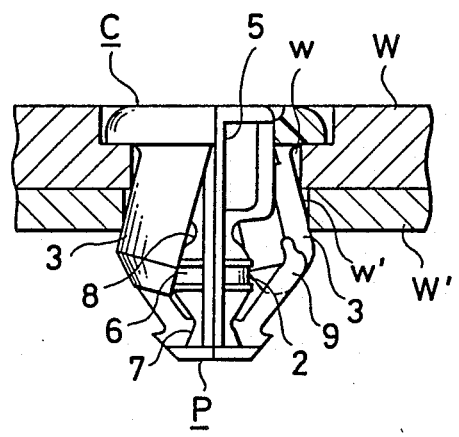
FIG. 13 is a side view showing a state in which first and second panel-like members are coupled together by means of the prior art fastener shown in FIG. 11.
Figure 14:
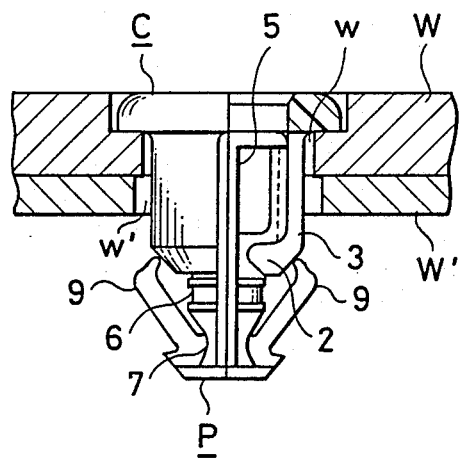
FIG. 14 is a sectional view showing a state in which the second panel-like member, to which the prior art fastener shown in FIG. 11 was coupled, is released.

In order to release the second panel-like member W' secured to the first panel-like member W by means of the fastener, the pin P is inserted further into the clip C, thus bringing the engagement projections 19 of the inclined portions 12a" of the clip C into engagement with the second reduced diameter portion 18 of the pin P as shown in FIG. 10. With this movement of the engagement projections 19, the legs 12a are released from their radially outwardly spread state, causing inward shrugging contraction of the inclined portions 12a". The second panel-like member W' is thus no longer clamped between legs 12 and first panel W, and it can be separated from the first panel-like member W.

In order to prevent the pin P from being excessively inserted into the clip C during its second insertion movement, its head 22 has a sufficiently large diameter so as to rest upon the inner top shoulders 12b of the leg section 12 and the inner shoulders 15c of the locking portions 15.

In order to use the removed fastener once again, the insertion head 23 of the pin P is pushed upwardly so as to cause sliding of the tapered surface 16b of the pin P along the inclined surfaces 20 at the free end of each leg section 12, thus bringing the projections 19 at the free end 12a' of each leg section 12 back to the first reduced diameter portion 17 of the pin P. In this state, the fastener can be used again.

As has been described in the foregoing, with the above construction of the fastener according to the invention it is possible to have the clip temporarily secured to the first panel-like member W before receiving the pin P, so that it is possible to position the second panel-like member W' relative to the temporarily secured clip C and then insert the pin P through the clip C.

Thus, there is no possibility of unexpected insertion of the pin P into the clip C so as to cause radially outward spreading of the leg section 12 of the clip C before mounting of the second panel-like member W' thereon. Furthermore it is possible to confirm the mounting hole w' of the second panel-like member W' through the hole of the clip C, thus facilitating the mounting of the second panel-like member W'.

Further, the elastic locking portions 15 can be formed such that they are loosely arcuate and project from the outer periphery of the clip C and that they have a comparatively large width. Still further, since the elastic locking portions 15 of the clip C are adapted to engage the edge of the mounting hole w of the first panel-like member W directly, the elastic locking portions 15 may extend to a comparatively small extent. Thus, the elastic locking portions 15 may be firm and eliminate the possibility of the clip C being detached or deformed while in the temporarily secured state when an external force is applied to the clip.

Still yet further, since the elastic locking portions 15 of the clip C are adapted to clamp only the first panel-like member W, they will not prevent removal of the second panel-like member W' when the second panel-like member is released from the clamping state as a result of the radially inward contraction of the leg section 12.

Obviously, many modifications and variations of the present invention are possible in light of the above teachings. It is therefore to be understood that within the scope of the appended claims, the present invention may be practiced otherwise than as specifically described herein.

What is claimed is:

1. A fastener for fastening together two panel members which are respectively provided with hole means defined therein for permitting mounting of said fastener therewithin, comprising:

a female member having a flange-like head for engaging an upper surface portion of a first one of said two panel members, an axially extending pin-insertion hole, flexibly resilient leg members dependently attached to said flange-like head at upper end portions thereof and surroundingly defining said pin-insertion hole, and elastic locking portions extending radially outwardly from said leg members within the vicinity of said upper end portions of said leg members so as to lockingly engage undersurface portions of said first one of said two panel members within the vicinity of said hole means defined within said first one of said two panel member; and a male pin member for insertion within said pin-insertion hole of said female member, said male pin member having a large diameter portion for matingly engaging said leg members of said female member when said male pin member has been axially inserted within said female member to a predetermined extent so as to radially expand lower end portions of said leg members, which are axially remote from said upper end portions of said leg members and said elastic locking portions, so as to clampingly engage undersurface portions of said second one of said two panel members within the vicinity of said hole means defined within said second one of said two panel members.

2. A fastener as set forth in claim 1, wherein:

said female member comprises a substantially cylindrical body dependently supported from said flange-like head and defining said pin-insertion hole axially within said cylindrical body, and wherein further, a plurality of axially extending slit means are defined within sidewall portions of said cylindrical body so as to extend from a lower open end of said cylindrical body upwardly to within the vicinity of said elastic locking portions and thereby define said flexibly resilient leg members upon said cylindrical body.

3. A fastener as set forth in claim 1, further comprising:
   substantially inverted U-shaped slit means defined upon said flexibly resilient leg members for forming said elastic locking portions upon said leg members.

4. A fastener as set forth in claim 1, further comprising:
   radially inwardly extending projections formed upon lower free end portions of said leg members for engaging said large diameter portion of said male pin member.

5. A fastener as set forth in claim 4, further comprising:
   first and second small diameter portions defined upon said male pin member at axial positions along said male pin member which are disposed in front of, and behind, said large diameter portion of said male pin member,
   whereby when said male pin member is inserted within said female member a first predetermined extent, said radially inwardly extending projections of said leg members are engaged with said first small diameter portion of said male pin member such that said male and female members are engaged with each other and said leg members are disposed in a radially contracted state so as not to clampingly engage said second one of said two panel members; while when said male pin member is inserted within said female member a second predetermined extent greater than said first predetermined extent, said radially inwardly extending projections of said leg members are engaged with said large diameter portion of said male pin member whereby said leg members clampingly engage said second one of said two panel members; and when said male pin member is inserted within said female member a third predetermined extent greater than said second predetermined extent, said radially inwardly extending projections of said leg members are engaged with said second small diameter portion of said male pin member such that said leg members are again radially contracted so as not to clampingly engage said second one of said two panel members whereby said first one of said two panel members can be separated from said second one of said two panel members while said fastener comprising said male and female members are still mounted within said first one of said two panel members.

6. A fastener as set forth in claim 1, wherein:
   four equiangularly, circumferentially spaced leg members are provided upon said female member.

7. A fastener as set forth in claim 1, wherein:
   two diametrically opposed elastic locking portions are provided upon said female member.

8. A fastener as set forth in claim 5, further comprising:
   shoulder means defined upon said upper end portions of said leg members for receivably seating a head portion of said male pin member when said male pin member has been axially inserted within said female member to said third predetermined extent.

* * * * *